United States Patent Office 3,424,567
Patented Jan. 28, 1969

3,424,567
METHOD OF STAINING GLASS AND GLASS STAINING COMPOSITION
Allison L. Smith, Vineland, N.J., assignor to Owens-Illinois, Inc., a corporation of Ohio
No Drawing. Filed May 20, 1964, Ser. No. 368,984
U.S. Cl. 65—30           4 Claims
Int. Cl. C03c *17/06, 17/26;* C03b *25/00*

The present invention relates to glass staining and more particularly to the method of staining borosilicate glasses that do not contain reducing agents. The present invention also pertains to the glass staining compositions.

Glass staining is an art which has been practiced for many years and refers to the coloration of a glass surface by ionic migration and, hence, differs from colored glass which is normally made by adding coloring ingredients to a molten glass batch, and also differs from coloring methods that leave a separate layer of coloring matter on the glass surface.

In the past, the art of staining glass has been carried out employing copper or silver compounds of various types or mixtures thereof which are mixed with a suitable vehicle to form a slurry or paste and applied to the glass surface to be stained. The glass surface is then baked at an elevated temperature. The staining effect takes place by an ion exchange mechanism wherein the metallic ion of the stain composition migrates into the glass structure in exchange for alkali ions of the glass and thereby become a part of the glass structure. The second step in the process is chemical reduction. The coloring ions are reduced to atoms. Finally the atoms in question join together to form submicroscopic particles or color centers.

In some glasses the second step, or chemical reduction, is brought about by means of a reducing agent contained in the glass structure. Arsenic is perhaps the element which is most widely used for this purpose.

Other glasses contain no effective reducing agent, and in staining such glasses, the reduction of ions to atoms, is accomplished by exposure to a reducing atmosphere at high temperatures. For this purpose a hydrogen containing atmosphere is sometimes used. Such a staining process consists of the following stages:

(1) Apply staining compound to the glass. This implants color-producing metallic ions in the glass.

(2) Fire in air at an elevated temperature, usually in the annealing range for the glass.

(3) Remove inert residue remaining on the glass surface by brushing, buffing or washing. Sometimes a muriatic acid wash is employed for this purpose.

(4) Reheat the ware, this time in a reducing atmosphere, to develop color.

This four-stage process is rather laborious, but is usually necessary in order to produce an acceptably deep stained coloration on glass which does not contain a reducing agent. Sometimes, because of the nature of the glassware, it is not practicable to apply the four-stage process. In such cases, the present invention is useful because it permits the production of a relatively deep stained coloration in glass which contains no reducing agent, without the necessity of resorting to the above-described, laborious four-stage process.

One of the most common uses for staining compositions is in the production of precision laboratory glassware, as for example, graduates, pipets, beakers, thermometers and the ilke. Many of these objects of laboratory equipment are made of special glasses which are resistant to thermal shock, chemical attack and the like. Heretofore, staining compositions which have been satisfactory for use in staining ordinary glasses such as soda-lime glasses have not been entirely satisfactory with the glasses of special composition and characteristics that are employed for the production of precision laboratory equipment. To illustrate, laboratory glassware is often made of borosilicate glasses because of the excellent resistance of these glasses to chemical attack and thermal shock. However, it is extremely difficult to obtain a deep stain color in borosilicate glasses that are free of arsenic or other reducing agents. Existing commercial staining preparations normally yield a pale color when applied to glasses such as borosilicate glasses which do not contain arsenic or some other reducing agent.

In order to correct this situation various compositions and methods have been devised to stain borosilicate glasses that are free of reducing agents, however, many disadvantages and shortcomings still exist. For example, the four-stage process involving two separate firings is employed as described above. This is quite laborious, and is not applicable to all types of ware. Other methods involve the burning of sulfur to provide an atmosphere of $SO_2$ during the baking step. However, such systems also have obvious disadvantages.

Two problems commonly encountered heretofore in the staining of lines, letters and numerals on glass are "spreading" and "bleeding." By "spreading," is meant the tendency of the stain to spread laterally in a uniform manner over the surface of the glass during the process of firing and thereby producing broader stained areas than are desired. The irregular staining effect whereby the edges of the stained area are fuzzy or fringe-like is referred to in the art as "bleeding." Obviously, both spreading and bleeding are undesirable, when occurring in ordinary glassware, but the problem becomes acute when occurring in precision laboratory glassware, where each line or character on the glassware must have sharp definition.

It would therefore be desirable to obtain a glass staining composition which is capable of producing a deep colored stain on glasses such as borosilicate glasses that are free of reducing agents without resorting to complicated multistage heating processes. In addition, it is desirable to obtain a glass staining composition that resists spreading and bleeding and produces lines and characters with sharp definition on the glass surface.

Accordingly, it is an object of the present invention to stain glass, particularly borosilicate glass that is free of reducing agents, with a staining composition that will produce a dark stain and which overcomes the disadvantages and short comings of prior employed methods and compositions.

It is a further object of the present invention to provide a method for staining glass, particularly borosilicate glass that is free of reducing agents, to produce a dark stain exhibiting improved resistance to spreading and bleeding.

It is a further object of the present invention to provide glass staining compositions that can be employed for borosilicate glasses free of reducing agents and which will produce a dark stain on the glass.

It is a further object of the present invention to provide glass staining compositions which can be used for the staining of borosilicate glasses free of arsenic to produce a deep coloration and sharp images on the glass surface without the need of a two step firing process.

In attaining the above objects, one feature of the present invention resides in a staining composition which contains cuprous sulfide, a member selected from the group consisting of silver oxide, silver sulfide and silver sulfate, a member selected from the group consisting of vanadium pentoxide, vanadium sulfide and vanadium sulfate, zinc sulfide and calcium sulfite.

Another feature of the present invention resides in having present, during a critical period in the firing step and in the immediate vicinity of the stained area of the glass, an atmosphere of sulfide vapors.

Other objects, features and advantages of the present invention will become apparent from the following detailed description thereof.

According to the present invention, an improved method for staining glasses, particularly borosilicate glasses which are substantially free of arsenic or other reducing agents, is provided by employing a glass staining composition which contains the following ingredients, all percentages hereinafter being based on the dry weight:

|                    | Percent |
|--------------------|---------|
| Cuprous sulfide    | 60–80   |
| Silver oxide       | 5–20    |
| Vanadium pentoxide | 5–12    |
| Zinc sulfide       | Up to 8 |
| Calcium sulfite    | Up to 8 |

It is understood that silver sulfide or silver sulfate may be used in place of the silver oxide. Likewise, vanadium sulfide or sulfate may be substituted for the vanadium pentoxide.

The method comprises applying a mixture of the above ingredients together with a vehicle to the surface of the glass, according to a predetermined design of lines or characters. After application of the above stain composition the glass and applied stain are fired to a temperature sufficiently high to effect the staining of the glass but insufficient to deleteriously affect the stain and lower than the temperature which would cause distortion, stresses or the like in the glass itself. Generally, the staining composition of the present invention produces a deep stain color when fired on an annealing schedule for about 20 minutes at 1025° F. with a peak of 1030° F. The color of the stain can be varied although dark reds and browns are most often desired.

In the preferred embodiment of the present invention the stain composition contains at least 1% of zinc sulfide and 1% of calcium sulfite. A particularly preferred composition of the present invention has the following formulation:

|                    | Percent |
|--------------------|---------|
| Cuprous sulfide    | 65      |
| Silver oxide       | 15      |
| Vanadium pentoxide | 10      |
| Zinc sulfide       | 5       |
| Calcium sulfite    | 5       |

The above stain composition, when mixed with a vehicle such as squeegee printing oil which is believed to contain materials such as rosin oil and pine oil to form a paste-like consistency and applied to a borosilicate glass free of reducing agent, produced a deep brown coloration after firing in air at 1025° F. to 1030° F. for 20 minutes.

In making the staining composition of the present invention and before application to the glass surface, the mixed ingredients identified above are preferably pulverized to less than about 10 microns grain size. It has been noted that this size is particularly useful in achieving the desired results in the present invention and aids in obtaining a more uniform color and a more sharply defined printed image.

The exact nature of the dispersing medium, better known as the vehicle, utilized in the stain composition of the present invention is not particularly critical. Any of the well known organic oils such as pine oil, vegetable oils, rosin oil and the like can be employed. Generally, the oils known as "printing oils" are particularly well suited for purposes of the invention. The amount of vehicle employed in making the stain composition can be varied, and is at least enough to form sufficient surface adhesion to transfer a proper amount of the mixture to the surface of the glass. In preparing the stain composition the solid ingerdients in finely divided form are milled together with the vehicle until a paste-like consistency is achieved. The proportions of vehicle to dry ingredients can be varied to achieve the desired consistency for any particular application. A ratio of one part liquid vehicle to three parts dry ingredients is illustrative of suitable proportions.

Any of the usual methods can be employed in applying the stains of the present invention including stencil screen, offset printing and the like. To illustrate, using a stencil screen containing the desired design, the oil-stain mixture is poured into the screen. Therafter a squeegee is wiped across the screen which presses the stain composition through selected portions of the screen mesh onto the surface of the glass in contact with the underside surface of the stencil screen thereby forming the predetermined design on the glass. The glass article having the stain composition on its surface forming the lines or characters then moves along on a conveyor belt, for example, for the firing step.

As pointed out above, the temperature of the baking step is not a critical aspect of the invention and the temperature employed will be determined in part by the melting or softening point of the glass being stained. Generally, from about 800° F. to about 1100° F. is suitable, although this can be varied.

The coloration is produced as a result of the migration of the silver and copper ions into the glass structure in exchange for the alkali ions of the glass composition in the vicinity of the stained area. The stain composition of the present invention is particularly effective in promoting the availability of metallic ions to migrate and also serves to promote the egress of alkali ions out of the glass. In the course of heating the stained glass surface during the baking step, the sulfur-containing compounds provide a sulfide atmosphere which may also contain sulfur oxide in the immediate vicinity of the stain area. It is believed that in displacing the normal atmosphere, the sulfide vapor provides a neutral or mildly reducing atmosphere and prevents the atmosphere around the glass surface from being too strongly oxidizing. Thus, the sulfide atmosphere serves a dual purpose: it slows down the oxidation of the copper and silver ions migrating into the glass and thereby extends the life of these migrating ions; and it also serves to react with the alkali ions emerging from the glass.

The vanadium pentoxide present in the stain composition functions to form alkali vanadates with emerging alkali ions and measurably contributes towards the particularly good results that are obtained according to the present invention.

Because they are relatively stable and do not prematurely break down during the early stages of the firing step, the zinc sulfide and calcium sulfite are believed to be responsible for the improved resistance to spreading and bleeding of the stain compositions of the present invention. Although applicant does not wish to be limited to any particular theory, it is believed that the zinc sulfide and calcium sulfite are stable in the early stages of heating and function as critical ingredients in the composition to decompose at the proper time to provide the sulfide atmosphere which controls the oxidation of the metallic ions, thereby extending the life of the migrating ions and reducing the tendency to spread and bleed.

While the stain compositions of the present invention have been described with particular reference to borosilicate glasses, it is to be understood that the present invention is applicable to other types of glasses including soda-lime, aluminosilicate and lead glasses.

What is claimed is:

1. A method of staining glass containing an alkali metal oxide which comprises applying to the glass a staining composition comprising 60 to 80% cuprous sulfide, 5 to 20% by weight of silver oxide, 5 to 12% vanadium pentoxide, 5% zinc sulfide and 5% calcium sulfite, and firing the glass and applied staining composition to a temperature sufficiently high to effect the staining of the glass.

2. A staining composition for use in the staining of glasses that are free of reducing agents which comprises 60 to 80% cuprous sulfide, 5 to 20% of a member selected from the group consisting of silver oxide, silver sulfide and silver sulfate, 5 to 12% of a member selected from the group consisting of vanadium pentoxide, vanadium sulfide, and vanadium sulfate, 5% zinc sulfide and 5% calcium sulfite.

3. In the method of staining glass as defined in claim 1 wherein the staining composition comprises 65% cuprous sulfide, 15% silver oxide, 10% vanadium pentoxide, 5% zinc sulfide and 5% calcium sulfite.

4. A staining composition for use in the staining of glasses that are free of reducing agents which comprises 65% cuprous sulfide, 15% silver oxide, 10% vanadium pentoxide, 5% zinc sulfide and 5% calcium sulfite.

References Cited

UNITED STATES PATENTS

| | | | |
|---|---|---|---|
| 1,947,781 | 2/1934 | Kreidl | 65—30 |
| 2,701,215 | 2/1955 | Kroeck | 65—30 |
| 3,000,761 | 9/1961 | Levi | 65—30 |

FOREIGN PATENTS 682,220   3/1964   Canada.

OTHER REFERENCES

Weyl: Coloured Glasses, published by Dawson's of Pall Mall, London, 1951, pp. 149–153 and 411–413 relied upon (65/30).

DONALL H. SYLVESTER, *Primary Examiner.*

J. H. HARMAN, *Assistant Examiner.*

U.S. Cl. X.R.

65—32; 106—290, 293; 117—124; 252—518